US011965420B2

(12) United States Patent
Wu et al.

(10) Patent No.: US 11,965,420 B2
(45) Date of Patent: Apr. 23, 2024

(54) SHIELD TUNNEL SEGMENT STRUCTURE AND CONSTRUCTION METHOD THEREOF

(71) Applicants: Shandong University, Jinan (CN); Northeast Electric Power University, Jilin (CN)

(72) Inventors: Ke Wu, Jinan (CN); Tao Yang, Jinan (CN); Yang Zheng, Jinan (CN); Guodong Li, Jinan (CN); Zhihao Xing, Jinan (CN); Hongna Yang, Jinan (CN); Jiaxiang Xu, Jinan (CN); Rong Chen, Jinan (CN); Dongxue Hao, Jinan (CN); Jizheng Sun, Jinan (CN); Jingchuan Duan, Jinan (CN); Hongwei Zhang, Jinan (CN)

(73) Assignees: Shandong University, Jinan (CN); Northeast Electric Power University, Jilin (CN)

( * ) Notice: Subject to any disclaimer, the term of this patent is extended or adjusted under 35 U.S.C. 154(b) by 0 days.

(21) Appl. No.: 18/347,206

(22) Filed: Jul. 5, 2023

(65) Prior Publication Data
US 2023/0349290 A1 Nov. 2, 2023

Related U.S. Application Data

(63) Continuation of application No. PCT/CN2021/076787, filed on Feb. 19, 2021.

(30) Foreign Application Priority Data

Feb. 9, 2021 (CN) .................... 202110174752.X

(51) Int. Cl.
*E21D 11/04* (2006.01)
*E21D 11/38* (2006.01)

(52) U.S. Cl.
CPC .............. *E21D 11/04* (2013.01); *E21D 11/38* (2013.01)

(58) Field of Classification Search
CPC .......... E21D 11/04; E21D 11/08; E21D 11/00
See application file for complete search history.

(56) References Cited

U.S. PATENT DOCUMENTS

| 2006/0284328 A1* | 12/2006 | Pantelides | E04C 2/06 428/297.4 |
| 2009/0191003 A1* | 7/2009 | Kruse | E04H 7/20 405/229 |

FOREIGN PATENT DOCUMENTS

| CN | 105756685 A | 7/2016 |
| CN | 106869963 A | 6/2017 |

(Continued)

*Primary Examiner* — Sean D Andrish

(57) ABSTRACT

Disclosed are a shield tunnel segment structure and a construction method thereof. The shield tunnel segment structure includes segment blocks sequentially spliced in a circumferential direction. Each segment block forms a closed annular segment structure, and outer diameters of adjacent annular segment structures gradually increase in an axial direction. At least two adjacent segment blocks of the same annular segment structure form an annular inner groove, and at least one segment block of the adjacent annular segment structures is provided with an inner bump which matches the annular inner groove. At least two adjacent segment blocks of the same annular segment structure form an annular outer groove, and at least one segment block of the adjacent annular segment structures is provided with an outer bump which matches the annular outer groove. The annular outer grooves and the annular inner grooves are staggered in the circumferential direction.

4 Claims, 4 Drawing Sheets

(56) References Cited

FOREIGN PATENT DOCUMENTS

| | | | |
|---|---|---|---|
| CN | 109026035 | A | 12/2018 |
| CN | 208310798 | U | 1/2019 |
| CN | 109973116 | A | 7/2019 |
| CN | 110017151 | A | 7/2019 |
| CN | 209100050 | U | 7/2019 |
| CN | 110671127 | A | 1/2020 |
| CN | 210564554 | U | 5/2020 |
| CN | 111963199 | A | 11/2020 |
| DE | 2435559 | * | 2/1976 |
| JP | H1054197 | A | 2/1998 |
| JP | H11294092 | A | 10/1999 |
| WO | 2008042106 | A2 | 4/2008 |

* cited by examiner ously focused on its circumferential splicing, or the overall performance of a tunnel formed by splicing segments, such as Chinese patent CN111963199A, which discloses a "concave-convex" shaped shield tunnel segment structure and a horizontal staggered seams segment splicing method. The "concave-convex" shaped shield tunnel segment structure includes shield head segment rings, shield middle segment rings and shield tail segment rings which are longitudinally connected in turn, and each segment ring is formed by connecting a capping block and a standard block in a circular direction. The standard block is designed with a concave-convex structure with a concave top and a convex bottom. Horizontal staggered seams can be realized by using fit splicing of the concave-convex structure. However, the segment structures are still of the same diameter. If the shield machine needs to change its excavation diameter during the excavation process according to the design requirements, how to install the segments after the excavation with variable diameters is still a difficult problem. Therefore, aiming at the problem of how to install the segments generated after the excavation with variable diameters in an underground tunnel, how to improve the design of a segment structure in order to speed up the construction of urban underground space has become an urgent problem to be solved.

SHIELD TUNNEL SEGMENT STRUCTURE AND CONSTRUCTION METHOD THEREOF

TECHNICAL FIELD

The present disclosure belongs to the technical field of underground tunnel engineering, and relates to a shield tunnel segment structure and a construction method thereof, in particular to a variable-diameter shear expansion type segment structure and a construction method thereof.

BACKGROUND

The construction of urban underground space is a hot topic in current urban construction. The development of underground transportation systems mostly depends on the excavation of tunnels, and a TBM (Tunnel Boring Machine) or a shield method is widely used in the construction of underground tunnels due to its characteristics of high safety, fast construction speed and small disturbance.

When an underground tunnel is constructed using a shield machine, a segment structure will be provided on a working surface that has been excavated by the shield machine, so as to support the shield machine into shape. At present, the research on a segment structure is mainly focused on its circumferential splicing, or the overall performance of a tunnel formed by splicing segments, such as Chinese patent CN111963199A, which discloses a "concave-convex" shaped shield tunnel segment structure and a horizontal staggered seams segment splicing method. The "concave-convex" shaped shield tunnel segment structure includes shield head segment rings, shield middle segment rings and shield tail segment rings which are longitudinally connected in turn, and each segment ring is formed by connecting a capping block and a standard block in a circular direction. The standard block is designed with a concave-convex structure with a concave top and a convex bottom. Horizontal staggered seams can be realized by using fit splicing of the concave-convex structure. However, the segment structures are still of the same diameter. If the shield machine needs to change its excavation diameter during the excavation process according to the design requirements, how to install the segments after the excavation with variable diameters is still a difficult problem. Therefore, aiming at the problem of how to install the segments generated after the excavation with variable diameters in an underground tunnel, how to improve the design of a segment structure in order to speed up the construction of urban underground space has become an urgent problem to be solved.

SUMMARY

A shield tunnel segment structure and a construction method thereof provided in the present disclosure can implement the installation of segments of tunnels with different diameters, and can achieve safe transition of the tunnels from one diameter to another.

The technical scheme of the present disclosure includes: a shield tunnel segment structure, including segment blocks which are sequentially spliced in a circumferential direction, where each segment block forms a closed annular segment structure, and the outer diameters of the annular segment structures adjacent in an axial direction gradually increase; at least two adjacent segment blocks of the same annular segment structure form an annular inner groove, and at least one segment block of the adjacent annular segment structures is provided with an inner bump which matches the annular inner groove; at least two adjacent segment blocks of the same annular segment structure form an annular outer groove, and at least one segment block of the adjacent annular segment structures is provided with an outer bump which matches the annular outer groove; and the annular outer grooves and the annular inner grooves are staggered in the circumferential direction.

Furthermore, each annular inner groove includes an annular inner front groove and an annular inner rear groove. At least two adjacent segment blocks form the annular inner front groove. At least two adjacent segment blocks form the annular inner rear groove. The annular inner front grooves and the annular inner rear grooves are staggered in the circumferential direction.

Alternatively, each annular outer groove includes an annular outer front groove and an annular outer rear groove. At least two adjacent segment blocks form the annular outer front groove. At least two adjacent segment blocks form the annular outer rear groove. The annular outer front grooves and the annular outer rear grooves are staggered in the circumferential direction.

Furthermore, the segment blocks include lower segments, right segments, upper segments and left segments which are sequentially spliced in the circumferential direction. The lower segments include at least two lower sub-segments. Ends of the at least two lower sub-segments are provided with grooves. When the two lower sub-segments are spliced, two grooves are connected to form an annular inner front groove.

The right segments include at least two right sub-segments Ends of the at least two right sub-segments are provided with grooves. When the two right sub-segments are spliced, two grooves form an annular inner rear groove.

The upper segments include at least two upper sub-segments. Ends of the at least two upper sub-segments are provided with grooves. When the two upper sub-segments are spliced, two grooves form an annular outer front groove.

The left segments include at least two left sub-segments. Ends of the at least two left sub-segments are provided with grooves. When the two left sub-segments are spliced, two grooves form an annular outer rear groove.

Furthermore, shear layers are arranged inside the segment blocks, and the shear layers are made of fiber reinforced polymer.

Furthermore, waterproof cushions are arranged at splicing positions of adjacent segment blocks, and the segment blocks are defined with grouting holes.

Furthermore, adjacent segment blocks are connected and fixed by shear bolts, and bolt holes are defined in the segment blocks.

The present disclosure also provides a construction method of a shield tunnel segment structure, including the aforementioned segment structure and including the following steps S1-S3.

Step S1, sequentially splicing segment blocks in a circumferential direction to form a first section of a closed annular segment structure, where the first section of the annular segment structure is formed with annular inner grooves and annular outer grooves.

Step S2, sequentially splicing the annular inner grooves and the annular outer grooves along the first section of the annular segment structure in the circumferential direction to form middle sections of closed annular segment structures, where the middle sections of the annular segment structures are formed with annular inner grooves and annular outer grooves, and the diameter of front sides of the middle sections of the annular segment structures is less than the diameter of rear sides thereof.

Step S3, sequentially splicing the annular inner grooves and the annular outer grooves along the middle sections of the annular segment structures in the circumferential direction to form an end section of a closed annular segment structure, where the diameters of a front side and a rear side of the end section of the closed annular segment structure are the same.

Furthermore, after spliced, the first section of the annular segment structure is fixed in the circumferential direction by means of shear bolts. After spliced, the middle sections of the annular segment structures are fixed by means of shear bolts in the circumferential direction; and after spliced, the end section of the annular segment structure is fixed by means of shear bolts in the circumferential direction.

Furthermore, the first section of the annular segment structure, the middle sections of the annular segment structures and the end section of the annular segment structure are connected and fixed by means of the shear bolts in an axial direction, and then grouting is performed through grouting holes defined in the segment blocks.

Furthermore, there are at least two middle sections of the annular segment structures. When circumferential splicing of the middle sections of the annular segment structures is performed, the splicing direction of the previous section of the annular segment structure is opposite to the splicing direction of the latter section of the annular segment structure.

The beneficial effects of the present disclosure are as follows: a block type design is adopted for a segment structure, block type segment blocks are spliced to form annular inner grooves and annular outer grooves, and inner bumps and outer bumps that each match the annular inner grooves and the annular outer grooves are designed on the segment blocks of the segment structure adjacent thereto. In this way, when segment blocks of adjacent segment structures are spliced together, a structure that gradually expands can be formed, so that the adjacent segment structure gradually changes its diameter to adapt to the safe transition from one diameter to another during tunnel construction. In addition, the splicing grooves that realize variable-diameter transition and bumps are staggered, which can improve the shear resistance of tunnels at variable diameters, and realize safe and fast variable-diameter tunnel construction.

BRIEF DESCRIPTION OF THE DRAWINGS

In order to more clearly illustrate the technical schemes in the embodiments of the present disclosure, the accompanying drawings that need to be used in the description of the embodiments will be briefly introduced below. Obviously, the accompanying drawings in the following description are only some embodiments of the present disclosure. Those of ordinary skill in the art can also obtain other accompanying drawings based on these accompanying drawings without any creative effort.

Figure 1:
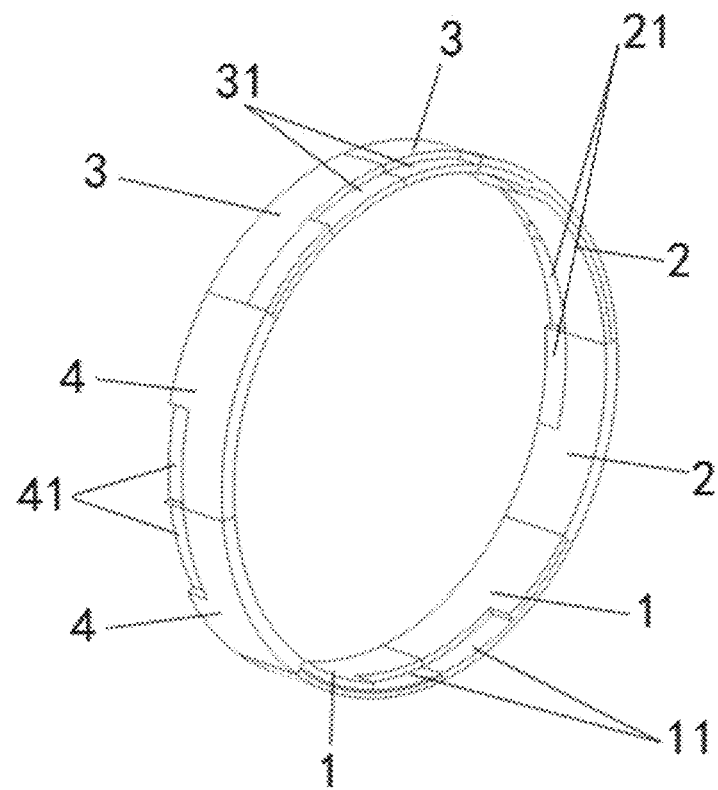
FIG. 1 is a schematic diagram of a segment structure in the embodiments.

Description of reference numerals: 1, lower segment, 11, lower segment inner groove, 2, right segment, 21, right segment inner groove, 22, bump, 3, upper segment, 31, upper segment outer groove, 4, left segment, 41, left segment outer groove, 5, grouting hole, 6, bolt hole, and 7, shear layer;

100, small-diameter section, 200, first variable-diameter section, 300, second variable-diameter section, 400, third variable-diameter section, 500, fourth variable-diameter section, 600, fifth variable-diameter section, and 700, large-diameter section.

DETAILED DESCRIPTION

In order to enable those skilled in the art to better understand the scheme of the present disclosure, the present disclosure will be further described in detail below in conjunction with the accompanying drawings and specific embodiments.

In this article, terms such as "upper", "lower", "left", "right", "inner", "outer" and the like are established based on the positional relationship shown in the accompanying drawings, and the corresponding positional relationship may also change accordingly depending on the accompanying drawings, which thus cannot be understood as an absolute limitation on the scope of protection. Moreover, terms such as "first", "second" and the like are only used to distinguish one from another part with the same name, while no such actual relationship or order between these parts is necessarily required or implied. In addition, in the embodiments of the present disclosure, "above", "below", and the like include the original number.

Disclosed in the embodiments of the present disclosure are a shield tunnel segment structure and a construction method thereof. Accordingly, the installation of segments of tunnels with different diameters can be implemented, and the shear resistance of the tunnels at variable cross-sections during the transition of variable diameters can be improved, so as to quickly and safely implement variable-diameter tunnel construction.

As shown in FIGS. 1 to 4, the shield tunnel segment structure of this embodiment includes segment blocks which are sequentially spliced in a circumferential direction, the segment blocks can be sequentially spliced in the circumferential direction to form closed annular segment structures, and the outer diameters of the annular segment structures which are adjacent in an axial direction and formed by splicing gradually increase, so that the installation of variable-diameter segments in tunnels can be implemented. In an embodiment, at least two adjacent segment blocks of the same annular segment structure can form an annular inner groove, and at least one segment block of the annular segment structures adjacently spliced thereto is provided with an inner bump which matches the annular inner groove. In addition, at least two adjacent segment blocks of the same annular segment structure can form an annular outer groove, and at least one segment block of the annular segment structures adjacently spliced thereto is provided with an outer bump which matches the annular outer groove. By using the annular inner grooves and the annular outer grooves designed at inner sides and outer sides of the annular segment structures, the diameter of the annular segment structure adjacent thereto can be changed, so that the installation of segments of variable-diameter tunnels can be implemented. In addition, the annular outer grooves and the annular inner grooves are staggered in the circumferential direction, so that the variable-diameter splicing positions are staggered, which can improve the shear resistance of tunnels at the variable diameters, and ensure a safe and fast construction process.

In an embodiment, each annular inner groove includes an annular inner front groove and an annular inner rear groove, and the front and rear directions are that the side facing an operator during construction is the front, and the side away from the operator is the rear. At least two adjacent segment blocks form the annular inner front groove, and at least two adjacent segment blocks form the annular inner rear groove. In particular, two different segment blocks each form the annular inner front groove and the annular inner rear groove, or some of the segment blocks that form the annular inner front groove and the annular inner rear groove are the same segment block. In addition, the annular inner front grooves and the annular inner rear grooves are staggered in the circumferential direction, so as to improve the shearing resistance of the formation of the variable-diameter segment structure.

Similarly, each annular outer groove includes an annular outer front groove and an annular outer rear groove, at least two adjacent segment blocks form the annular outer front groove, at least two adjacent segment blocks form the annular outer rear groove, and the annular outer front grooves and the annular outer rear grooves are staggered in the circumferential direction.

Referring to FIG. 1, it shows a closed annular segment structure formed by sequentially splicing eight segment blocks in the circumferential direction. Certainly, it should be known that the use of eight segment blocks here is for illustrative purposes only. Different numbers of segment blocks can be flexibly selected according to specific size of the constructed tunnel and the structure of each segment block, which is not specifically limited in this embodiment.

As shown in FIG. 1, the segment blocks include lower segments 1, right segments 2, upper segments 3 and left segments 4 which are sequentially spliced in the circumferential direction, and there are two segments for each, where the ends of the two lower segments 1 are provided with grooves, and when the segments are spliced, the two grooves are connected to form an annular inner front groove, that is, a lower segment inner groove 11 in FIG. 1; the ends of the two right segments 2 are provided with grooves, and when the segments are spliced, the two grooves form an annular inner rear groove, that is, a right segment inner groove 21; the ends of the two upper segments 3 are provided with grooves, and when the segments are spliced, the two grooves form an annular outer front groove, that is, an upper segment outer groove 31; and the ends of the two left segments 4 are provided with grooves, and when the segments are spliced, the two grooves form an annular outer rear groove, that is, a left segment outer groove 41.

After sequentially spliced, eight adjacent segment blocks are connected and fixed by shear bolts. In order to facilitate the installation of the shear bolts, bolt holes 6 are defined in the segment blocks, and to improve the shear resistance of the entire segment structure, shear layers 7 are arranged in the segment blocks. Specifically, the shear layers can be made of fiber reinforced polymer (FRP). In this way, the segment structure uses shear bolts, staggered overlapping segment blocks and shear layers to jointly resist the pressure from a variable cross-section soil layer, so as to enhance and improve the shear resistance of segment structures of variable-diameter tunnels.

In addition, waterproof cushions are arranged at splicing positions of adjacent segment blocks, so as to improve the waterproof performance of the formed segment structure, prevent pore water in the soil layer outside the tunnel segment structure from infiltrating into the tunnel, and improve the safety of tunnel construction operations. Specifically, the waterproof cushions can be made of common waterproof materials, and the segment blocks can be prefabricated in the factory in advance according to the cross-sectional shape and size of the construction site, so as to increase the construction speed of an on-site tunnel.

Figure 2:
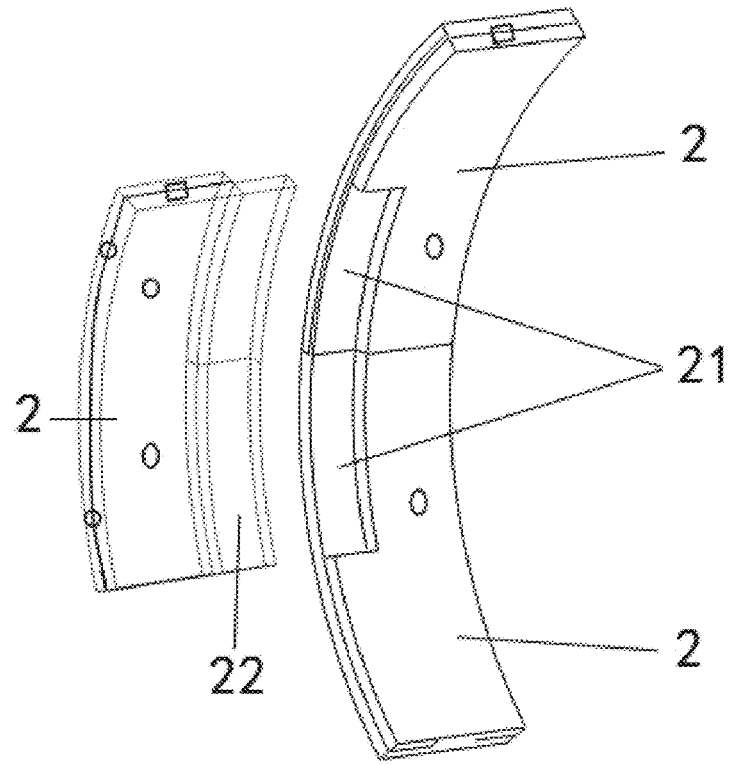
FIG. 2 is a schematic diagram of the splicing of the right segments in the embodiments.
Figure 3:
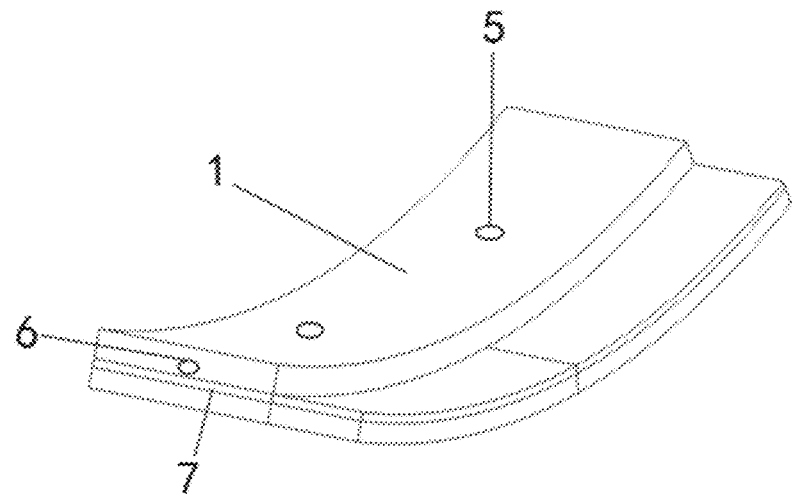
FIG. 3 is a schematic diagram of a lower segment in the embodiments.

Taking the splicing of the right segments 2 shown in FIG. 2 as an example, after the splicing of a section of the annular segment structure is completed, a segment block of the latter section adjacent thereto can be designed with a bump 22, and the bump 22 arranged with the right segments 2 is overlapped at a right segment inner groove 21 formed by two right segments 2 of the previous section of the segment structure. Moreover, after this section of the segment structure is spliced, inward grouting can be performed at the positions of grouting holes 5 of the segment blocks thereof, so as to improve its connection strength and firmness.

This embodiment also provides a construction method of a shield tunnel segment structure, including the aforementioned segment structure and including the following steps:

sequentially splicing segment blocks in a circumferential direction to form a first section of a closed annular segment structure, where the first section of the annular segment structure is formed with annular inner grooves and annular outer grooves;

sequentially splicing the annular inner grooves and the annular outer grooves along the first section of the annular segment structure in the circumferential direction to form middle sections of closed annular segment structures, where the middle sections of the annular segment structures are formed with annular inner grooves and annular outer grooves, and the diameter of front sides of the middle sections of the annular segment structures is less than the diameter of rear sides thereof; and sequentially splicing the annular inner grooves and the annular outer grooves along the middle sections of the annular segment structures in the circumferential direction to form an end section of a closed annular segment structure, where the diameters of a front side and a rear side of the end section of the closed annular segment structure are the same.

Figure 4:
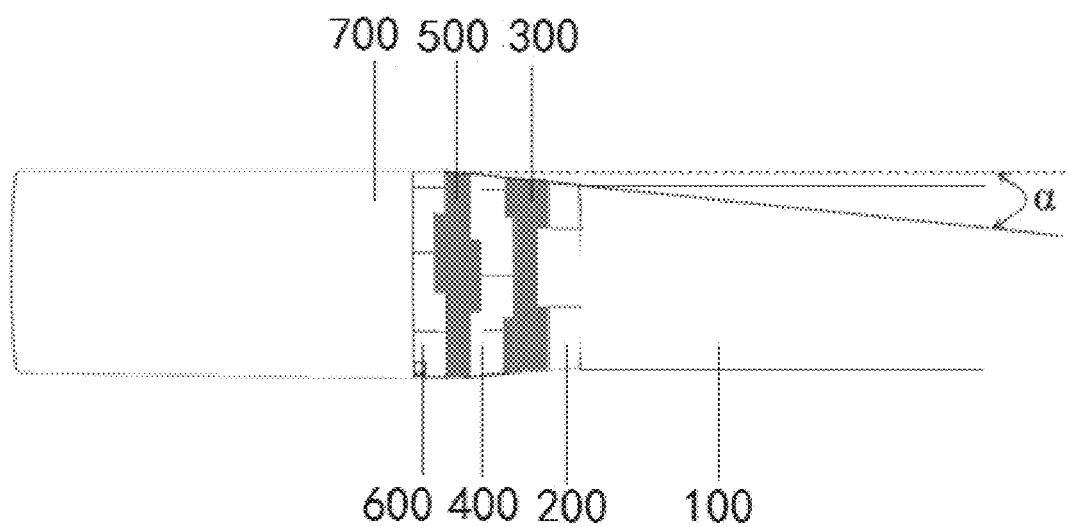
FIG. 4 is a schematic top view of the installed segment structures in the embodiments.
Figure 5:
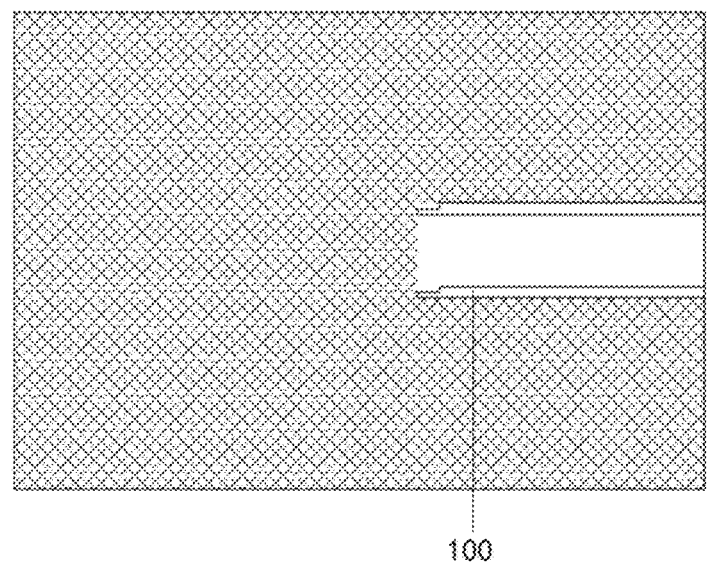
FIG. 5 is a schematic cross-sectional view of initial construction in the embodiments.
Figure 6:
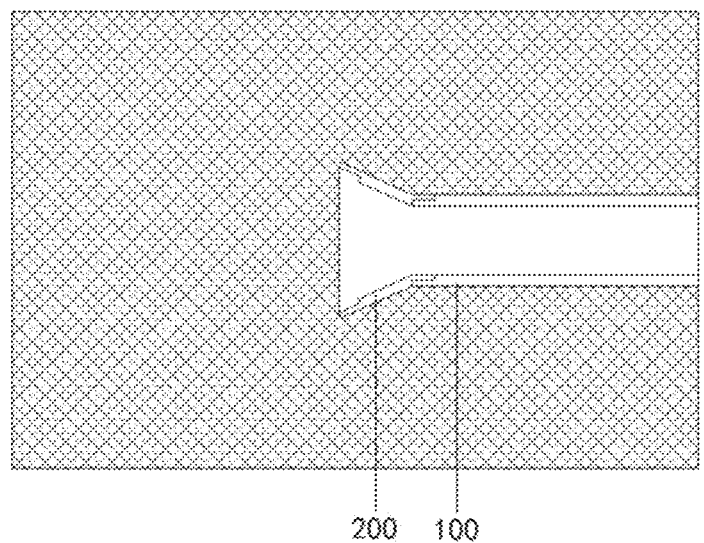
FIG. 6 is a schematic cross-sectional view of an intermediate process of construction in the embodiments.
Figure 7:
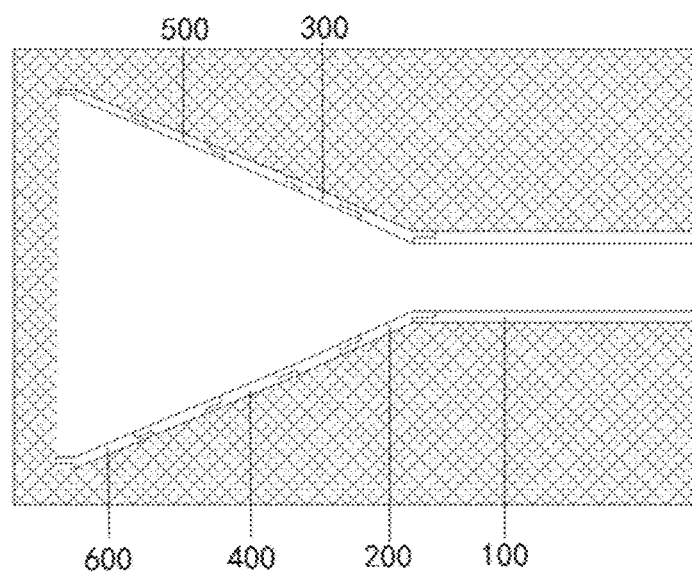
FIG. 7 is a schematic cross-sectional view of another intermediate process of construction in the embodiments.
Figure 8:
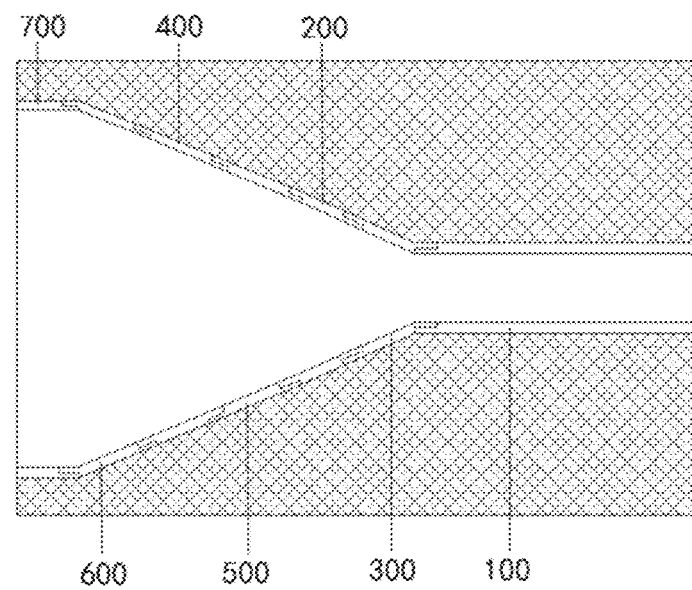
FIG. 8 is a schematic cross-sectional view of the end of construction in the embodiments.

In an embodiment, as shown in FIG. 5 first, the tunnel is first excavated and segments are installed to form a small-diameter section 100, and then the diameter of the excavated tunnel gradually increases. At this time, the aforementioned segment structure is spliced at the small-diameter section 100. A first variable-diameter section 200 as shown in FIG. 6 is formed. In the first variable-diameter section 200, in the direction of bottom, left, top and right, a lower segment 1, a right segment 2, an upper segment 3 and a left segment 4 are sequentially spliced in the circumferential direction; an upper segment 3, a left segment 4, a right segment 2 and a lower segment 1 of the latter section of the annular segment structure are then sequentially spliced in the circumferential direction to form a second variable-diameter section 300 as shown in FIG. 7; in the direction of bottom, left, top and right, a lower segment 1, a right segment 2, an upper segment 3 and a left segment 4 are sequentially spliced in the circumferential direction to form a third variable-diameter section 400; repeating in this way, splicing is performed in the opposite direction to the splicing direction of adjacent variable-diameter sections to form a fourth variable-diameter section 500 and a fifth variable-diameter section 600, and after the variable-diameter requirements for the tunnel are met, splicing is performed at a rear side of the fifth variable-diameter section 600 to form a large-diameter section 700 as shown in FIG. 8, thus forming a segment structure with increasing diameter from front to back, with the inclination angle of the entire segment structure being a, as shown in FIG. 4.

After the splicing of each section of segment structure, that is, after the splicing of the first variable-diameter section 200, the second variable-diameter section 300, the third variable-diameter section 400, the fourth variable-diameter section 500 and the fifth variable-diameter section 600 is completed, various segment blocks of the same variable-diameter section or adjacent variable-diameter sections are connected and fixed using the shear bolts. Afterwards, grouting can be performed through the grouting holes 5 in the segment blocks.

According to the shield tunnel segment structure and construction method thereof provided in this embodiment, segment blocks can be spliced to each other between tunnels of different diameters, and the segment blocks can ensure safe transition of tunnels from one diameter to another in a manner of overlapping, bolted connection and shear layers. In addition, an annular inner groove and an annular outer groove are formed by splicing two segment blocks, and when the next splicing is performed, inner and outer protrusions of one segment block are used to overlap the annular inner groove and the annular outer groove, which can realize the staggered joint between segment blocks, and at the same time, can improve the shear resistance and integrity between segment blocks. The annular outer grooves are arranged on the upper segments 3, and the annular inner grooves are arranged on the lower segments 1, which is not only convenient for installation, but also can enhance the stability of the latter section of segment structure. In addition, outer grooves are reserved at the left segments 4, inner grooves are reserved at the right segments 2, and the grooves on both sides alternate inside and outside, which not only reduces staggered deformation of segment blocks in a transition section of variable-diameter tunnels, but also can improve the stability of the entire structure. Finally, FRP fiber layers, that is, the shear layers 7 are embedded in the segment blocks, so that shear deformation of tunnels due to uneven soil stress in a variable-diameter transition section can be prevented.

In the case that the various embodiments do not contradict each other, at least part of the technical schemes in the embodiments can be recombined to form the substantive technical scheme of the present disclosure, and certainly, the embodiments can also refer to or include each other. Moreover, it should be noted that adaptive adjustments and modifications made by those skilled in the art when recombining the technical means described in the embodiments will also fall within the protection scope of the present disclosure.

The above describes the technical principles of the present disclosure in conjunction with specific embodiments. However, it should be noted that the above descriptions are only for explaining the principles of the present disclosure, and cannot be construed as specific limitations on the protection scope of the present disclosure in any way. Based on the explanations herein, those skilled in the art can think of other specific implementations or equivalent replacements of the present disclosure without creative effort, all of which will fall within the protection scope of the present disclosure.

What is claimed is:

1. A shield tunnel segment structure, comprising segment blocks which are sequentially spliced in a circumferential direction, wherein each segment block forms a closed annular segment structure, and outer diameters of adjacent annular segment structures gradually increase in an axial direction; at least two adjacent segment blocks of the same annular segment structure form an annular inner groove, and at least one segment block of the adjacent annular segment structures is provided with an inner bump which matches the annular inner groove; at least two adjacent segment blocks of the same annular segment structure form an annular outer groove, and at least one segment block of the adjacent annular segment structures is provided with an outer bump which matches the annular outer groove; and the annular outer grooves and the annular inner grooves are staggered in the circumferential direction wherein each annular inner groove comprises an annular inner front groove and an annular inner rear groove, at least two adjacent segment blocks form the annular inner front groove, at least two adjacent segment blocks form the annular inner rear groove, and the annular inner front grooves and the annular inner rear grooves are staggered in the circumferential direction; and/or each annular outer groove comprises an annular outer front groove and an annular outer rear groove, at least two adjacent segment blocks form the annular outer front groove, at least two adjacent segment blocks form the annular outer rear groove, and the annular outer front grooves and the annular outer rear grooves are staggered in the circumferential direction;

wherein the segment blocks comprise lower segments, right segments, upper segments and left segments which are sequentially spliced in the circumferential direction; the lower segments comprise at least two lower sub-segments, ends of the at least two lower sub-segments are provided with grooves, and when the two lower sub-segments are spliced, two grooves are connected to form the annular inner front groove;

the right segments comprise at least two right sub-segments, ends of the at least two right sub-segments are provided with grooves, and when the two right sub-segments are spliced, two grooves form the annular inner rear groove;

the upper segments comprise at least two upper sub-segments ends of the at least two upper sub-segments are provided with grooves, and when the two upper sub-segments are spliced, two grooves form the annular outer front groove; and the left segments comprise at least two left sub-segments, ends of the at least two left sub-segments are provided with grooves, and when the two left sub-segments are spliced, two grooves form the annular outer rear groove.

2. The shield tunnel segment structure of claim 1, wherein shear layers are arranged inside the segment blocks, and the shear layers are made of fiber reinforced polymer.

3. A construction method of a shield tunnel segment structure, comprising the shield tunnel segment structure of claim 1 and comprising the following steps:

sequentially splicing segment blocks in a circumferential direction to form a first section of a closed annular segment structure, wherein the first section of the annular segment structure is formed with first annular inner grooves and first annular outer grooves;

sequentially splicing the first annular inner grooves and the first annular outer grooves along the first section of an annular segment structure in the circumferential direction to form middle sections of closed annular segment structures, wherein the middle sections of the annular segment structures are formed with second annular inner grooves and second annular outer grooves, and a diameter of front sides of the middle sections of the annular segment structures is less than a diameter of rear sides thereof; and sequentially splicing the second annular inner grooves and the second annular outer grooves along the middle sections of the annular segment structures in the circumferential direction to form an end section of a closed annular segment structure, wherein diameters of a front side and a rear side of the end section of the closed annular segment structure are the same.

4. The construction method of a shield tunnel segment structure of claim 3, wherein after spliced, the first section of the annular segment structure is fixed in the circumferential direction by means of shear bolts; after spliced, the middle sections of the annular segment structures are fixed by means of shear bolts in the circumferential direction; and after spliced, the end section of the annular segment structure is fixed by means of shear bolts in the circumferential direction.

\* \* \* \* \*